(12) United States Patent
Kitamura

(10) Patent No.: US 6,169,521 B1
(45) Date of Patent: Jan. 2, 2001

(54) BUILT-IN ANTENNA

(75) Inventor: Toshiyasu Kitamura, Yokohama (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/419,967

(22) Filed: Oct. 18, 1999

(30) Foreign Application Priority Data

Nov. 11, 1998 (JP) ................................................. 10-320515

(51) Int. Cl.⁷ ..................................................... H01Q 1/24
(52) U.S. Cl. ........................................... 343/702; 343/906
(58) Field of Search .................................. 343/906, 702; 455/90; 379/433

(56) References Cited

U.S. PATENT DOCUMENTS

| 5,258,892 | 11/1993 | Stanton et al. ....................... 361/814 |
| 5,874,920 | * 2/1999 | Araki et al. ........................... 343/702 |
| 5,986,608 | * 11/1999 | Korisch et al. ....................... 343/702 |

FOREIGN PATENT DOCUMENTS 764 997 A1  3/1997 (EP) .

* cited by examiner

*Primary Examiner*—Don Wong
*Assistant Examiner*—Trinh Vo Dinh
(74) *Attorney, Agent, or Firm*—Pearne & Gordon LLP

(57) ABSTRACT

One ridge of an elastic member having a rectangular cross-section is placed on a lower case so as to contact with the deepest part of the trough thereof. Further, a built-in antenna is placed at its mounting position on the lower case. At the time, a feeder part of the built-in antenna is placed on another ridge without having the elastic member having the rectangular cross-section bonded. Moreover, a land of a printed board is placed so as to contact with the feeder part. The printed board is fixed at a portion not illustrated. The land of the printed board and the feeder part are contacted preferably by receiving the repulsion of the elastic member having the rectangular cross-section.

7 Claims, 4 Drawing Sheets

BUILT-IN ANTENNA

BACKGROUND OF THE INVENTION

The present invention relates to a built-in antenna to be mounted in a case for a portable radio device, in particular, it relates to that capable of providing a necessary contact without having a high elastic modulus in the metal of the tip part of the built-in antenna, utilizing an inclined part provided in the case.

Conventionally, configurations shown in FIGS. 7 and 8 have been adopted for contacting a feeder part of a built-in antenna and a printed board. That is, in a first conventional configuration shown in FIG. 7, a feeder part of a built-in antenna 21 bonded with a lower case 22 and a printed board 24 are contacted by a pin connector 23 provided in the printed board 24.

In a second conventional configuration shown in FIG. 8, a feeder part of a built-in antenna 31 bonded with a lower case 32 and a printed board 33 are contacted according to the tip part of the built-in antenna 31 having a spring property so as to allow the contact with the printed board 33.

There is a problem in that a metal with a high elastic modulus needs to be used at a portion of the feeder part comprising the built-in antenna so as to contact with, for example, a pin connector provided in a printed board as well as the cost is increased for the need of mounting the pin connector to the printed board.

In the first conventional configuration shown in FIG. 7, a problem is involved in that the pin connector needs to be provided in the printed board so that the cost is increased for mounting the pin connector on the printed board.

Moreover, in the second conventional configuration shown in FIG. 8, a problem is involved in that a metal comprising the tip part to serve as the feeder part of the built-in antenna needs to have a high elastic modulus for contacting with the printed board with a predetermined pressure.

SUMMARY OF THE INVENTION

Accordingly, an object of the invention is to provide a built-in antenna with a simple configuration without the need of mounting a special part in a printed board for contact nor the need of having a high elastic modulus in the metal comprising the tip part of the built-in antenna at a low cost.

In order to solve the problems, the invention is a built-in antenna comprising a feeder part to be mounted in a case for a portable radio device for contacting with a land of a printed board, wherein the case is provided with an inclined part, with an elastic member having a rectangular cross-section placed on a V-shaped trough provided at the peak of the inclined part, and the feeder part is disposed on a ridge part of the elastic member having the rectangular cross-section.

DETAILED DESCRIPTION OF THE PREFERRED EMBODIMENTS

Figure 1:
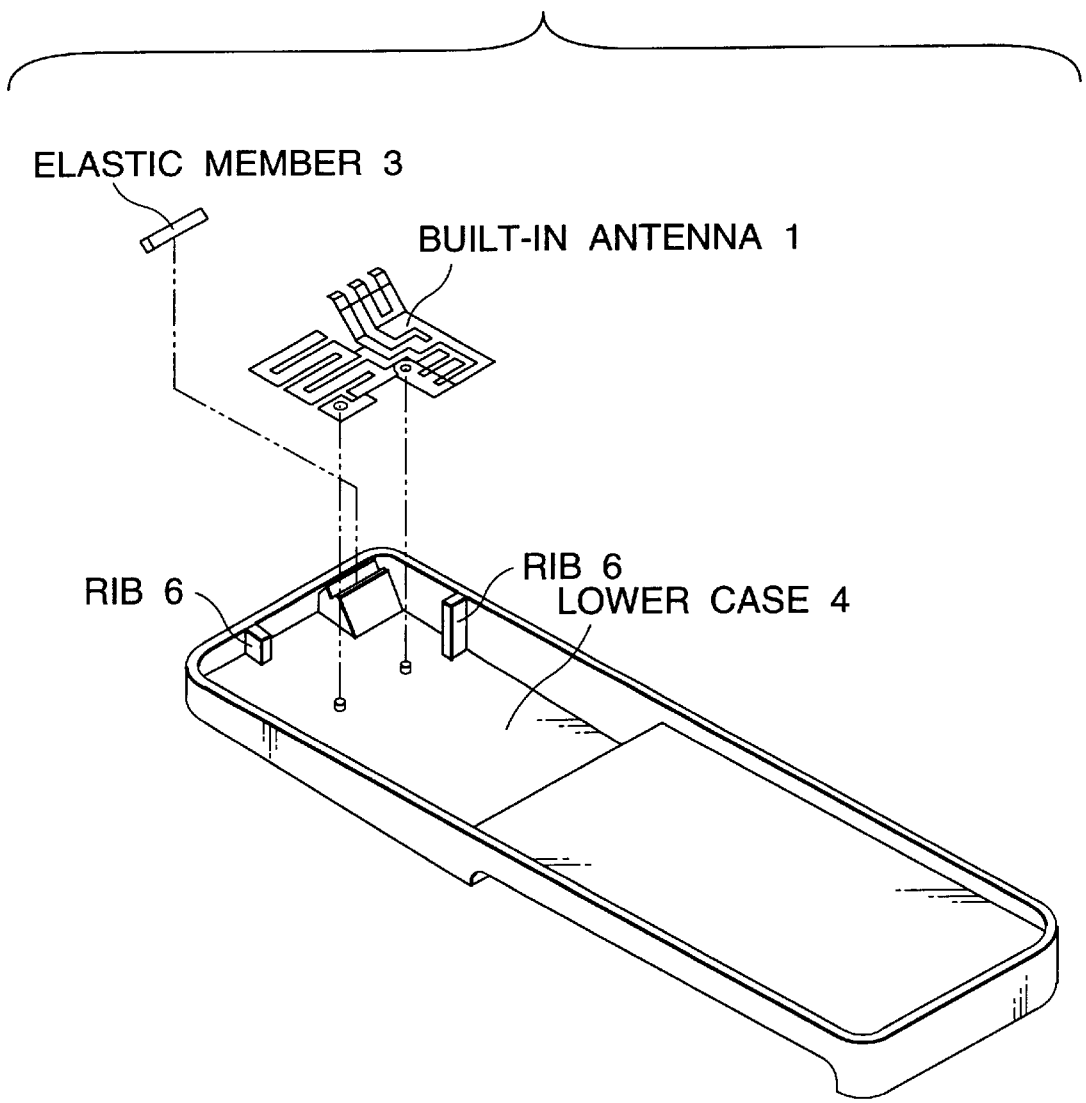
FIG. 1 is a perspective view showing the state of mounting a built-in antenna according to an embodiment of the invention to a lower case of a portable radio device.

Since a first aspect of the invention is a built-in antenna comprising a feeder part to be mounted in a case for a portable radio device for contacting with a land of a printed board, wherein the case is provided with an inclined part, with an elastic member having a rectangular cross-section placed on a V-shaped trough provided at the peak of the inclined part, and the feeder part is disposed on a ridge part of the elastic member having the rectangular cross-section, it is advantageous in that a necessary contact is provided by utilizing the inclined part provided in the case without having a high elastic modulus in the metal comprising the tip part of the built-in antenna.

Moreover, since a second aspect of the invention is the built-in antenna according to the first aspect, wherein a bonding surface is provided on a shorter side of the rectangular cross-section of the elastic member so as to be bonded to one side of the V-shaped trough provided at the peak of the inclined part, it is advantageous in that the amount of labor can be saved in bonding to the case by providing the bonding surface on a shorter side of the rectangular cross-section of the elastic member.

Furthermore, since a third aspect of the invention is the built-in antenna according to the first aspect, wherein the inclined part of the case serves also as an inclined part for forming a hole for a strap, it is advantageous in that a plurality of inclined parts need not be provided by using the same part for different purposes.

Moreover, since a fourth aspect of the invention is the built-in antenna according to the first aspect, wherein the elastic member having a rectangular cross-section is a silicone sponge with a high expansion ratio, it is advantageous in that a necessary contact is provided without having a high elastic modulus in the metal comprising the tip part of the built-in antenna.

Furthermore, since a fifth aspect of the invention is the built-in antenna according to the first aspect, wherein a holding rib is provided upright in the case for holding the printed board after the land of the printed board contacts with the feeder part of the built-in antenna and the elastic member ensures a certain compression amount, it is advantageous in that the printed board can be held by the holding rib provided in the case.

Moreover, since a sixth aspect of the invention is the built-in antenna according to the first aspect, wherein the feeder part of the built-in antenna is provided slidably on the land of the printed board with a certain distance during the period the printed board contacts with the holding rib provided upright in the case after the land of the printed board contacts with the feeder part of the built-in antenna and the elastic member ensures a certain compression amount, it is advantageous in that the contact portion is cleaned by the slide of the feeder part on the land with a certain distance.

Furthermore, since a seventh aspect of the invention is a portable radio device comprising the built-in antenna according to any of the first aspect to the sixth aspect, it is advantageous in that a portable radio device can be produced at a low cost.

Hereinafter an embodiment of the invention will be explained with reference to FIGS. 1 to 6.

FIG. 1 is a perspective view of a built-in antenna according to the embodiment of the invention to be mounted onto the lower case of a portable radio device. In FIG. 1, an elastic member 3 is bonded to a V-shaped trough provided at the peak of an inclined part of the lower case 4. Then, the built-in antenna 1 is mounted to a predetermined position of the lower case 4. Furthermore, a printed board 8 is held by a holding rib 6 provided upright on the lower case. At the time, a land 9 of the printed board 8 contacts with a feeder part 2 of the built-in antenna so that a certain compression amount is ensured by the elastic member 3.

Figure 2:
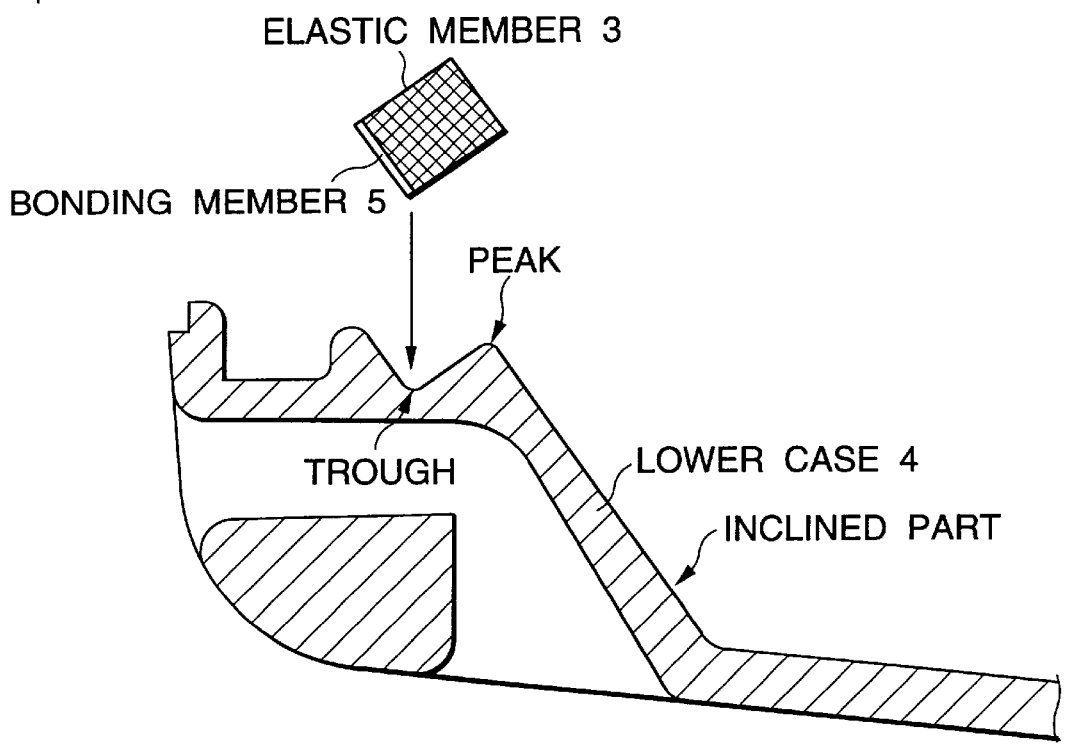
FIG. 2 is a side cross-sectional view showing the state of mounting an elastic member according to the embodiment of the invention to the lower case.

FIG. 2 is a side cross-sectional view showing the state of mounting the elastic member according to the embodiment of the invention to the lower case. A bonding member 5 is mounted on a shorter side of the rectangular cross-section of the elastic member 3, and a ridge of the elastic member 3 is contacted with the deepest part of the V-shaped trough provided at the peak of the inclined part of the lower case 4. As the elastic member 3 having a rectangular cross-section, a silicone sponge with a high expansion ratio can be used preferably.

Figure 3:
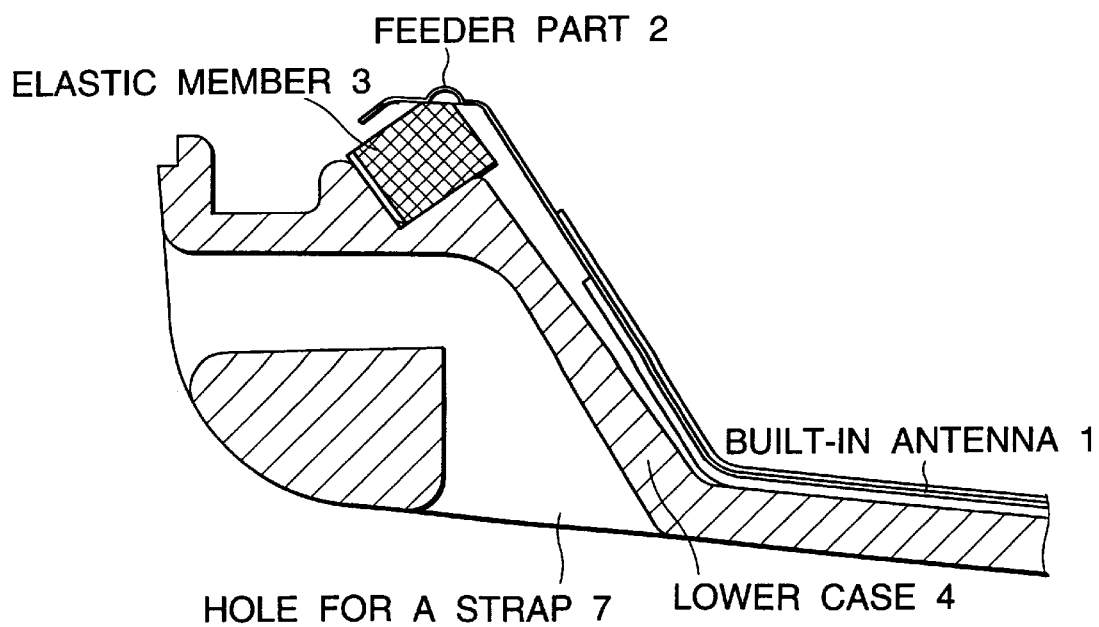
FIG. 3 is a side view showing the arrangement relationship between the elastic member and a feeder part of the built-in antenna according to the embodiment of the invention.

FIG. 3 is a side view showing the arrangement relationship between the elastic member and the feeder part of the built-in antenna according to the embodiment of the invention. The feeder part 2 of the built-in antenna 1 is placed on another ridge of the elastic member 3 mounted as shown in FIG. 2.

Figure 4:
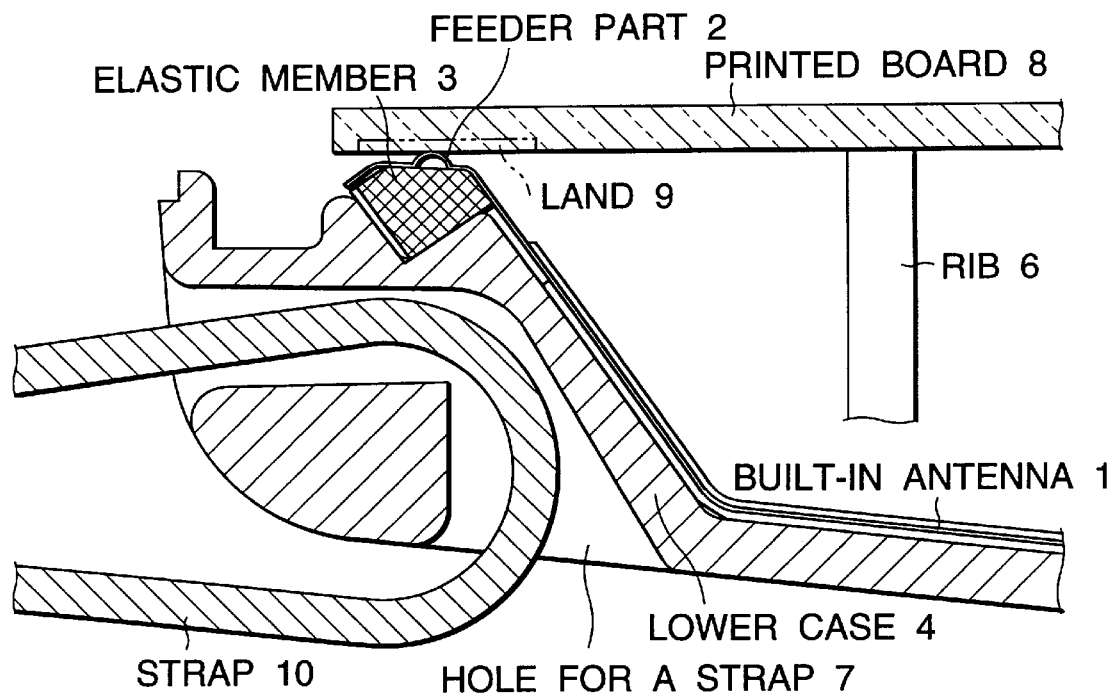
FIG. 4 is a side cross-sectional view showing the configuration of the built-in antenna according to the embodiment of the invention after completing the mounting operation.

FIG. 4 is a side cross-sectional view showing the configuration of the built-in antenna according to the embodiment of the invention after completing the mounting operation. In FIG. 4, it is observed that a land 9 of the printed board 8 and the feeder part 2 of the built-in antenna 1 are contacted while receiving the repulsion of the elastic member 3 at the ridge part of the elastic member 3. At the time, the printed board 8 is held by the holding rib 6 as well as it is fixed at a portion not illustrated.

Although the inclined part provided in the lower case 4 is used also as the inclined part for forming a hole 7 for putting a strap through in the configuration shown in FIG. 4, it is not limited thereto, but the inclined parts can be provided independently. In FIG. 4, it is observed that the strap 10 is inserted through the hole 7 for the strap.

Figure 5:
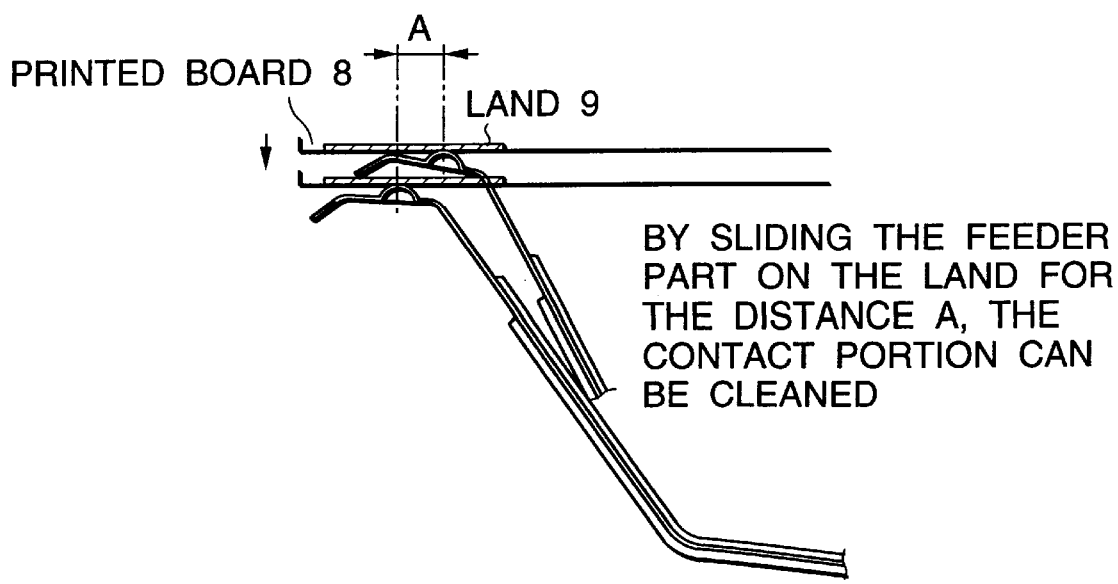
FIG. 5 is a side view showing the contact process between the feeder part of the built-in antenna and the land of the printed board according to the embodiment of the invention.

FIG. 5 is a side view showing the contact process between the feeder part of the built-in antenna and the land of the printed board according to the embodiment of the invention. In FIG. 5, the feeder part 2 of the built-in antenna is provided slidably on the land 9 of the printed board for a distance A such that the contact portion of the feeder part 2 is cleaned thereby so as to allow the contact of the feeder part 2 of the built-in antenna and the land 9 of the printed board 8 in the cleaned state.

Figure 6:
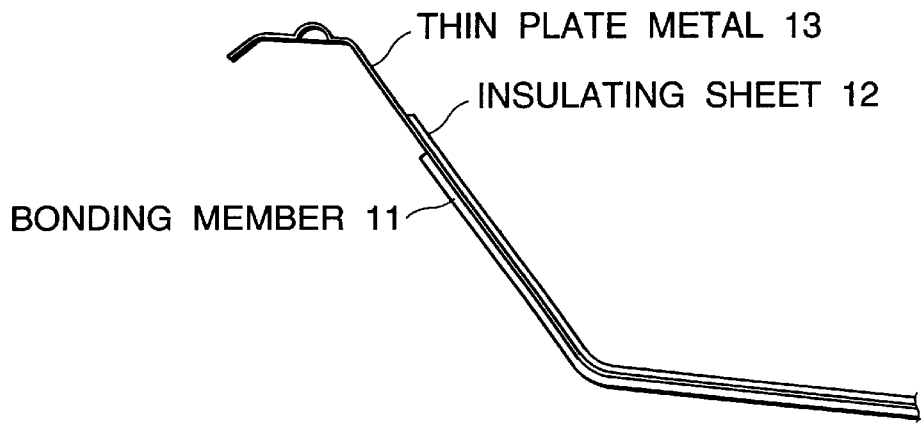
FIG. 6 is a side view showing the configuration of a conductive spring part of the built-in antenna according to the embodiment of the invention.
Figure 7:
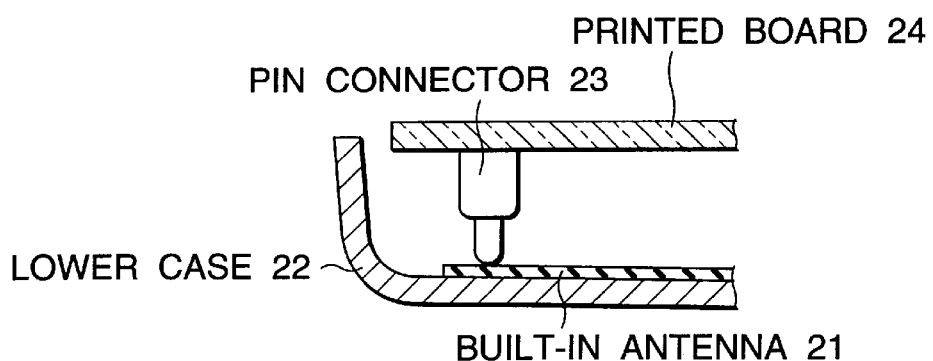
FIG. 7 is a diagram showing a first conventional configuration of a built-in antenna.
Figure 8:
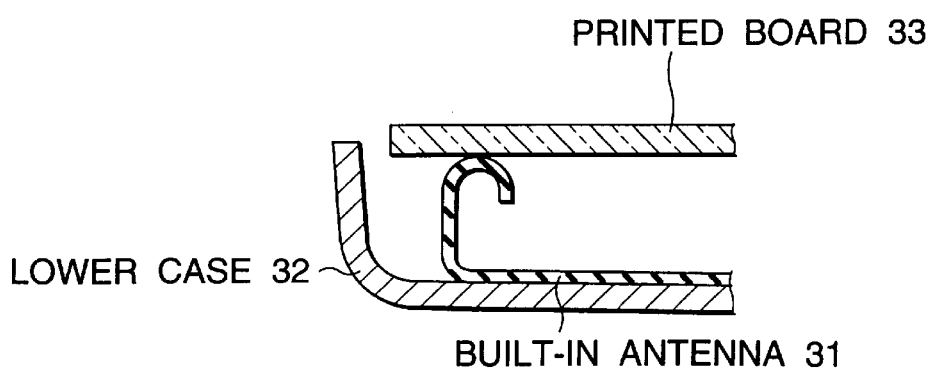
FIG. 8 is a diagram showing a second conventional configuration of a built-in antenna.

FIG. 6 is a side view showing the configuration of a conductive spring part of the built-in antenna according to the embodiment of the invention. In FIG. 6, the conductive spring part of the built-in antenna comprises a thin sheet metal 13 as a metal at the tip part. An insulating sheet 12 is bonded onto the thin sheet metal 13 except the tip part. Furthermore, a bonding member 11 is provided below the thin sheet metal 13 for bonding to the lower case 4.

Since a built-in antenna according to the invention with the above-mentioned configuration comprises a case provided with an inclined part, with an elastic member having a rectangular cross-section placed on a V-shaped trough provided at the peak of the inclined part, and the feeder part is disposed on a ridge part of the elastic member having the rectangular cross-section, it is advantageous in that a necessary contact is provided by utilizing the inclined part provided in the case without having a high elastic modulus in the metal comprising the tip part of the built-in antenna.

What is claimed is:

1. A built-in antenna comprising:

a case for a portable radio device;

a feeder part to be mounted in said case for contacting with a land of a printed board, wherein said case is provided with an inclined part, with an elastic member having a rectangular cross-section placed on a V-shaped trough provided at the peak of the inclined part, and said feeder part is disposed on a ridge part of said elastic member having the rectangular cross-section.

2. The built-in antenna according to claim 1, wherein a bonding surface is provided on a shorter side of the rectangular cross-section of said elastic member so as to be bonded to one side of the V-shaped trough provided at the peak of the inclined part.

3. The built-in antenna according to claim 1, wherein the inclined part of said case serves also as an inclined part for forming a hole for a strap.

4. The built-in antenna according to claim 1, wherein said elastic member having a rectangular cross-section is a silicone sponge with a high expansion ratio.

5. The built-in antenna according to claim 1, wherein said case includes;

a holding rib upright in said case for holding said printed board after the land of said printed board contacts with the feeder part of said built-in antenna and said elastic member ensures a certain compression amount.

6. The built-in antenna according to claim 1, wherein the feeder part of said built-in antenna is provided slidably on the land of said printed board with a certain distance during a period that said printed board contacts with said holding rib provided upright in said case after the land of said printed board contacts with the feeder part of said built-in antenna and said elastic member ensures a certain compression amount.

7. The portable radio device comprising the built-in antenna according to any one of claims 1 to 6.

* * * * *